J. D. PARROT.

Motive-Power.

No. 5,210. Reissued Dec. 31, 1872.

Witnesses:
Ernst Bilhuber
Chas. Wahlers.

Inventor.
John D. Parrot
pr
Van Santvoord & Hewitt
Attys

AM. PHOTO-LITHOGRAPHIC CO. N.Y. (OSBORNE'S PROCESS.)

UNITED STATES PATENT OFFICE.

JOHN D. PARROT, OF MORRISTOWN, NEW JERSEY.

IMPROVEMENT IN MOTIVE POWERS.

Specification forming part of Letters Patent No. 39,827, dated September 8, 1863; reissue No. 5,210, dated December 31, 1872.

*To all whom it may concern:*

Be it known that I, JOHN D. PARROT, of Morristown, in the county of Morris and State of New Jersey, have invented a new and Improved Motive Power; and I do hereby declare the following to be a full, clear, and exact description thereof, which will enable those skilled in the art to make and use the same, reference being had to the accompanying drawing forming part of this specification, in which drawing—

Figure 1:
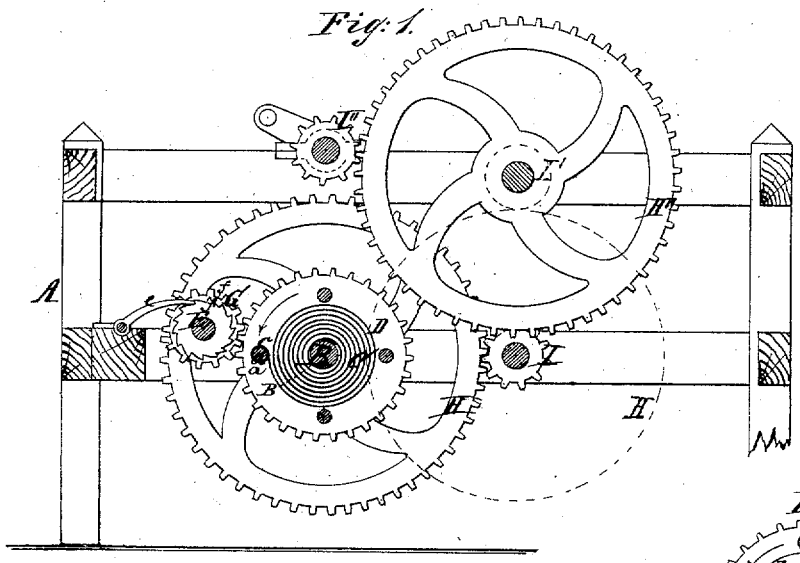
Figure 3:
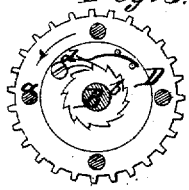
Figure 2:
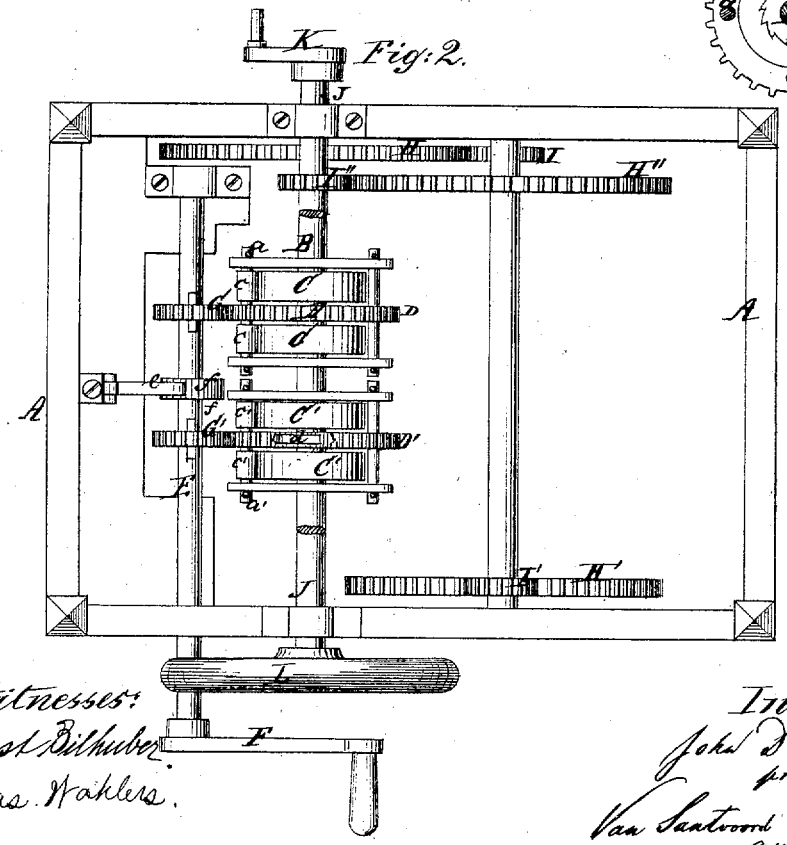

Figure 1 represents a longitudinal vertical section of my invention; Fig. 2 is a plan or top view of the same; and Fig. 3 is a detached sectional view of one of the spring-wheels.

Similar letters indicate corresponding parts.

This invention consists in the arrangement of two or more springs or sets of springs mounted on one and the same shaft and connected to a winding mechanism so constructed that either one of the springs can be wound independent of the other, and that a motive power is obtained which allows of employing any number of springs required, said springs being so arranged that the operator can at will use any one or any number of them at the same time, and thereby the power obtained by the apparatus can be increased or diminished to correspond to the desired effect.

In the drawing, the letter A designates a frame made of timber or any other suitable material, and sufficiently strong to support the working parts of my power. This frame forms the bearings for the shaft B, on which are mounted two or more springs, C C′. These springs are connected at their inner ends to said shafts, the connection being effected by pins or in any other suitable manner. The outer ends of said springs are connected by means of loops *c c′* to pins *a a′*, which pass transversely through cog-wheels D D′, so that by rotating one of said cog-wheels in the direction of the arrow marked on it in Figs. 1 and 3, the spring or springs connected to it are wound up. It will be noticed that in the example shown in the drawing the springs are connected in pairs to the wheels D D′, so as to equalize the strain on the wheels and for the sake of greater convenience in the manufacture of the springs and of the whole mechanism. The wheels D D′ are mounted loosely on the shaft B, and they rotate on ratchet-wheels *b*, which are placed in their centers, (see Fig. 3,) and which are firmly keyed on the shaft. Pawls *d* allow the wheels D D′ to rotate independent of the shaft in the direction of the arrow marked on one of them in Figs. 1 and 3, but if the wheels are turned in the direction opposite to said arrow the pawls *d* engage with the teeth of the ratchet-wheels *b*, and the shaft is compelled to rotate with them. The springs C C′ are wound up by turning the wheels D D′ in the direction of the arrow marked thereon in Figs. 1 and 3, while the shaft B is held stationary by the gear-wheels or the machinery connected thereto, as will be presently described. For the purpose of winding up said springs, a shaft, E, is provided, which carries a winch, F, and a series of pinions, G G′, one for each of the spring-wheels D D′. These pinions are secured to their shaft in such a manner that they can be readily thrown in or out of gear with the wheels D D′. If one of said pinions G is thrown in gear with the wheel D, and the shaft E is turned in the proper direction, the springs C alone are wound up, while the springs C′ remain inactive; or, if these last-named springs have been previously wound up, they continue to act while the springs C are being wound up; and, if all the pinions G G′ are thrown in gear with their spring-wheels, all the springs are wound up simultaneously. It is obvious that the number of springs connected to the shaft B may be increased if it should be desirable to increase the power. The shaft E is prevented from turning in the wrong direction by a pawl, *e*, gearing into a ratchet-wheel, *f*, which is firmly keyed to said shaft. The motion of the shaft B is transmitted by cog-wheels H H′ H″ and pinions I I′ I″ to the crank-shaft J, and the crank K at the end of this shaft connects with the mechanism to which it is desired to impart motion. A balance-wheel, L, on the shaft J serves to equalize the motion.

By this arrangement any desired amount of power can be employed for the purpose of operating a certain machine, such as a sewing-machine, turning-lathe, or a churn. One or more springs or sets of springs can be brought in action whenever it is desired, and either of the springs can be wound up during the operation of the remaining spring or springs without interfering with the motion of the power.

What I claim as new, and desire to secure by Letters Patent, is—

The arrangement of two or more springs or sets of springs mounted on one and the same shaft and connected to a winding mechanism so constructed that either one of these springs or sets of springs can be wound independent of the other, substantially in the manner herein shown and described.

This specification signed by me this 16th day of December, 1872.

JOHN D. PARROT.

Witnesses:
W. HAUFF,
E. F. KASTENHUBER.